United States Patent [19]

Kindig et al.

[11] Patent Number: 4,602,424

[45] Date of Patent: Jul. 29, 1986

[54] METHODS OF INSULATING LEAD CONNECTIONS FOR DYNAMOELECTRIC MACHINE WINDINGS

[75] Inventors: Alan L. Kindig, Holland, Mich.; Ho H. Tew, Singapore, Singapore

[73] Assignee: General Electric Company, Fort Wayne, Ind.

[21] Appl. No.: 617,177

[22] Filed: Jun. 4, 1984

[51] Int. Cl.$^4$ ............................................. H02K 15/02
[52] U.S. Cl. ...................................... 29/596; 29/859; 310/42; 310/71
[58] Field of Search ...................... 310/71, 42; 29/596, 29/598, 859

[56] References Cited

U.S. PATENT DOCUMENTS

| | | | |
|---|---|---|---|
| Re. 30,817 | 12/1981 | Loyd et al. | 156/86 |
| 3,219,857 | 11/1965 | Fisher | 310/71 |
| 3,259,864 | 7/1966 | Marzolf et al. | 336/192 |
| 3,303,243 | 2/1967 | Hughes et al. | 264/22 |
| 3,441,759 | 4/1969 | Watkins | 310/71 |
| 3,555,316 | 1/1971 | Bleich | 310/71 |
| 3,603,720 | 9/1971 | Rabie | 174/52 R |
| 3,742,123 | 6/1973 | Haub, Jr. | 174/138 |
| 3,748,510 | 10/1973 | McNeal | 310/71 |
| 3,748,511 | 7/1973 | Crabb | 310/71 |
| 3,748,512 | 7/1973 | Crabb | 310/71 |
| 3,862,492 | 1/1975 | Crabb | 29/596 |
| 3,912,957 | 10/1975 | Reynolds | 310/71 |
| 4,227,103 | 10/1980 | Humes, Jr. et al. | 310/71 |
| 4,291,455 | 9/1981 | Schnyder | 29/596 |
| 4,381,464 | 4/1983 | Schnyder | 310/45 |

Primary Examiner—Carl E. Hall
Attorney, Agent, or Firm—Ralph E. Krisher, Jr.

[57] ABSTRACT

A connection insulator for a dynamoelectric machine having a magnetic core and at least one winding arranged thereon comprising a plurality of coils of wire conductors with end turns thereof projecting beyond side faces of the core and being subject to pressure forces during compacting and forming and with lead wires extending therefrom. The insulator is formed of a flexible heat-shrinkable electrical insulating material and comprises a tubular portion with an open end adapted to receive an electrical connection joining at least one of the lead wires with another wire and a closed end with an integral flat tab portion extending axially therefrom at a junction with the tubular portion. A substantial part of the tab portion spaced from the junction is adapted to be grippingly engaged by the end turns of one of the coils and a substantial part of the tubular portion spaced from the junction is adapted to be grippingly engaged by the end turns of an adjoining coil. The electrical connection is located within the tubular portion and adjacent the closed end thereof. The parts of the tubular and tab portions not engaged by the end turns of adjoining coils span a space between adjoining coils and are substantially unaffected by pressure forces applied during compacting and forming of the end turns. A stator assembly with lead wire connections insulated by these connection insulators and methods of forming such stator assemblies are also described.

10 Claims, 11 Drawing Figures

METHODS OF INSULATING LEAD CONNECTIONS FOR DYNAMOELECTRIC MACHINE WINDINGS

FIELD OF THE INVENTION

This invention relates generally to connection insulators for use in dynamoelectric machines and more particularly to a method of making stator assemblies of such methods utilizing such connection insulators.

BACKGROUND OF THE INVENTION

In the manufacture of alternating current dynamoelectric machines, such as induction motors, a number of phase windings are emplaced in a stator core of magnetic material. These phase windings, formed of coils of insulated wire conductors and defining circumferentially spaced poles, must have lead wires thereof interconnected and connections made to insulated external power lead wires. As such connections are typically formed by mechanically crimping bared ends of such interconnected lead wires, these connections must be insulated. These insulated connections are subjected to high levels of electrical stress during motor operation and the windings are typically subjected during the manufacturing process to pressure forces to compact and form the end turns thereof. Also, mechanical crimping of the electrical connection may sometimes form small projecting metal burrs or sharp edges that could puncture or rupture the connector insulator or at least reduce its insulation value. It is important, therefore, that the connection insulator be able to undergo various steps in the motor manufacturing process and maintain its insulation value so that the motor will function reliably and effectively and have a long service life. This is particularly true for motors incorporated in a hermetically sealed compressor for an air conditioner, or refrigerator, for example, where motor failure means not simply replacement of the motor but the entire hermetically sealed compressor. In such uses the electrical connector should not contain any components or be fabricated from material which would during usage form compounds or substances which would deleteriously affect the refrigerant, lubricant, the wire insulation or other components of the motor-compressor unit.

A number of different connection insulators for motors are known such as those disclosed in co-assigned U.S. Pat. Nos. 3,219,857, 3,748,510, and 4,227,108. Another connection insulator for this purpose, but formed of heat-shrinkable material with the bore of the insulator containing a mastic-like adhesive material, is disclosed in U.S. Pat. No. 4,381,464.

It would, however, be advantageous and desirable to provide a connection insulator that would be even more effective in providing and maintaining high insulation values for the electrical connections insulated thereby both during fabrication and during operation of motors which incorporate such connection insulators in the stator assemblies thereof. Further, it is believed that further improvements can be made in stator assemblies utilizing such connector insulators and in methods for making such assemblies.

SUMMARY OF THE INVENTION

Among the several objects of the invention may be noted the provision of an improved method of making a stator assembly for dynamoelectric machines or electric motors utilizing connection insulators which have improved effectiveness both during motor fabrication and during motor operation in maintaining a high insulation value and avoiding puncturing or weakening of the connector insulator by relatively sharp burrs and edges of the electrical connections being insulated thereby; the provision of such improved method in which the connection insulators may be readily utilized in commercial motor production and do not require any changes in conventional motor production facilities; the provision of such improved method utilizing such connection insulators which minimize fabrication time in the production of motors and in which the major components of the motor remain unchanged; the provision of such improved method in which the connection insulators have improved and more secure anchoring to the motor windings and better retention of the connector insulated thereby; the provision of such improved method wherein the stator assemblies with lead wires insulated by such connection insulators which when incorporated in motors provide improved service life and reliability; and the provision of such improved method in which the connection insulators require no mastic material to effect reliable retention of the connector being insulated and which are particularly useful in the production of hermetic motors.

Other objects and features will be in part apparent and in part pointed out hereinafter.

In general and in one form of the invention, a method for making a stator assembly for a dynamoelectric machine, having a magnetic core and at least one winding arranged thereon comprising a plurality of coils of wire conductors with end turn thereof projecting beyond side faces of the core and with lead wires extending therefrom, comprises the steps of forming an electrical connection joining at least one of the lead wires with another wire. The connection is inserted into the open end of a tubular portion of a flexible heat-shrinkable electrical insulator having a closed end and an integral flat tab portion extending axially from the closed end of the tubular portion so as to position the electrical connection adjacent the closed end of the tubular portion. The insulator is heated to shrink it so as to grip the connection therein and the heat-shrunk connector-bearing insulator is positioned to locate a substantial part of the free end of the tab portion so as to engage the end turns of one coil and positioning the free end of the tubular portion so as to engage the end turns of an adjoining coil with the parts of the tubular portion and the tab portion not engaged by the end turns of the adjoining coils spanning a space therebetween. Pressure is applied to the end turns to compact and form them and the connection and the parts of the tubular portion and the tab portion not engaged by the end turns are substantially unaffected by pressure forces applied during compacting and forming of the end turns.

In general, and in a further form of the invention, a method for making a stator assembly for a dynamoelectric machine, having a magnetic core and at least one winding arranged thereon comprising a plurality of coils of wire conductors with end turns thereof projecting beyond side faces of the core and with lead wires extending therefrom, comprises the initial step of forming an electrical connection joining at least one of the lead wires with another wire. The connection is inserted into the open end of a tubular portion of a flexible heat-shrinkable electrical insulator having a closed end and an integral flat tab portion extending axially from the closed end of the tubular portion so as to position the electrical connection adjacent the closed end of the tubular portion. Pressure is applied to the end turns to compact and form them and the connection and the parts of the tubular portion and the tab portion not engaged by the end turns are substantially unaffected by pressure forces applied during such compacting and forming of the end turns. The insulator is heated to shrink it so as to grip the connection therein.

BRIEF DESCRIPTION OF THE DRAWINGS

Corresponding reference characters indicate corresponding parts throughout the several views of the drawings.

The exemplifications set out herein illustrate preferred embodiments of the invention in several forms thereof and such exemplifications are not to be construed as limiting the scope of the disclosure or the scope of the invention in any manner.

DESCRIPTION OF PREFERRED EMBODIMENTS

Figure 1:
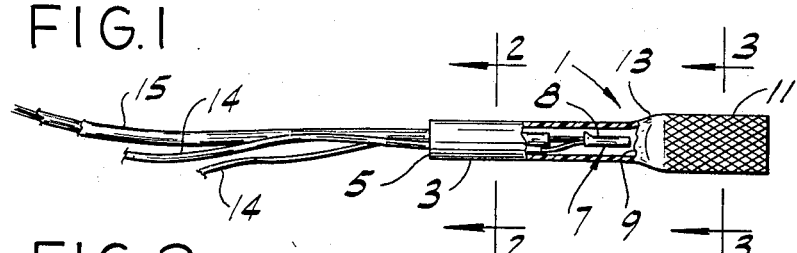
FIG. 1 is a view of a connection insulator of the present invention with a portion broken away to show the electrical connection insulated thereby and the interconnected lead wires extending therefrom.
Figure 2:
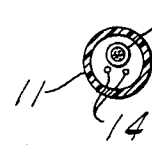
FIGS. 2 and 3 are sections taken on lines 2—2 and 3—3, respectively, of FIG. 1.
Figure 3:
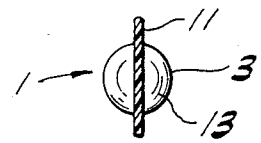
Figure 4:
FIGS. 4—6 are views similar to FIG. 1 showing alternative embodiments of connection insulators of the present invention.
Figure 5:
Figure 6:

Referring now to the drawings in general, a connection insulator is indicated generally at reference character 1 and is shown to have a tubular portion 3 with an open end 5 for receiving an electrical connection 7, and a closed end 9 with an integral flat tab portion 11 extending axially therefrom at a junction 13 with the tubular portion. Connection insulator 1 is formed from a flexible heat-shrinkable insulating material such as heat-shrinkable polyester film. The tubing from which connection insulators 1 are fabricated may be formed, for example, from spiral-wound plies of polyethylene terephthlate film bonded together by a suitable adhesive with low extractables (2.5% max.). Typical tubing would have a wall thickness of approximately 0.012" (0.3 mm.) wth a heat shrinkage of about 50/25% in diameter and approximately 30% in length and having a minimum dielectric strength of 4000 volts. Approximate dimensions of an exemplary insulator 1 are about 2" (51 mm.) in length with the tab portion 11 being about ⅝" (16 mm.) long and the tubular portion (inner length) being about 1⅜" (35 mm.) long and with an inside diameter of about ¼" (6 mm.). The flattened tab portion comprising about ⅓ the length of the connector 1 is formed by ultrasonic sealing and bonding while pressing an end portion of the desired length of the tubing between opposed platens having surface patterns to provide rough surfaces on both sides of the tab portion. The rough surface pattern may be knurled as shown in FIG. 1 or ribbed axially as in connection insulator 1A (FIG. 4), or ribbed transversely as in connection insulator 1B (FIG. 5), or ribbed both axially and transversely as in connection insulator 1C (FIG. 6).

Electrical connection 7 interconnects the bared ends of insulated lead wires 14 to the bared end of another insulated lead wire 15. While such a connection may be made by twisting the wire ends together and then soldering or brazing them, the more common practice is to form such electrical connections by inserting the bared lead wire ends into an uninsulated metal sleeve connector 8 (such as available under the trade designations "Essex" and "Amp") and mechanically crimping the sleeve to upset the metal thereby providing both a strong mechanical as well as a good electrical connection between the lead wires. Such connections are typically used to form interpole connections, to electrically connect terminal ends of windings of the stator assemblies of electric motors to each other and to interconnect winding lead wires and winding taps to external power leads.

Figure 7:
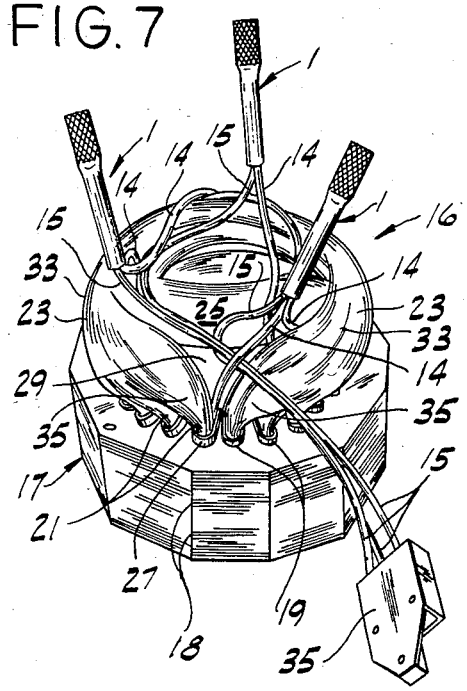
FIG. 7 is a perspective of a partially completed stator assembly illustrating an initial step in a method of the present invention for forming a stator assembly and with the heat-shrinkable connection insulators positioned on electrical connections to be insulated.

FIGS. 7–11 illustrate exemplary steps in a method of this invention for making stator assemblies of alternating current induction motors in accordance with this invention utilizing connection insulators 1, 1A, 1B, and 1C described above. Referring more particularly to FIG. 7, there is shown a stator assembly 16 in an intermediate stage of manufacture. The assembly includes a magnetic core 17 conventionally fabricated from a number of identical laminations 18 punched from thin magnetic sheet material. The laminations are held in stacked, juxtaposed position by customary means such as interlaminate bonding material, welding across the stack periphery, or by cooperating grooves and keys, and has a number of angularly spaced aligned teeth which terminate in a motor receiving bore, and define angularly spaced winding accommodating slots 19 therebetween. These slots receive concentrically arranged coils 21 of a main or running winding 23 which form opposed running poles, and the concentrically arranged coils of a displaced-in-phase auxiliary or start winding 25, the end turns of these windings projecting beyond the side faces of stator core 17. Each of the coils is formed of a number of turns of enameled or magnet wire and is insulated from the walls of the winding slots by slot liners 27 and is retained in the slots by conventional slot wedges (not shown). The end turns of the coils of windings 23 and 25 are insulated one from the other by a layer of flexible sheet insulating material comprising "window" or between-phase insulation 29.

The bared ends of terminal lead wires 14 of the windings are shown selectively connected at connection 7 by crimped connectors 8 to the bared ends of three insulated external power lead wires 15, the other ends thereof being connected to respective contacts of a connector plug 35. These lead wires may be employed to connect the windings in parallel or series circuit relation with a suitable source of power through customary switch means (not shown). Preferably terminal wires 14 are not only insulated by their enamel coating but also by lengths of flexible insulating tubing which provide high dielectric strength barriers to protect these lead wires in their routing from the winding coils to crimped connections 7.

Figure 8:
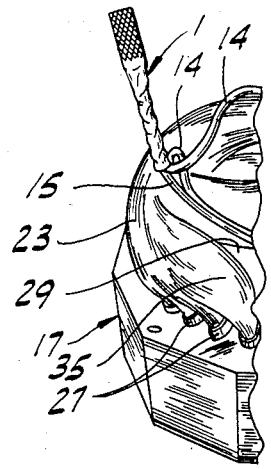
FIG. 8 is a fragment of FIG. 7 after a heating step to shrink the connection insulators and grip the electrical connection being insulated thereby.

Connection insulators 1 are placed over the respective crimped connections 7 as shown in FIG. 7. The inner dimensions of the tubular portion 3 are sufficiently generous to easily accept the interconnected lead wires 14 and 15 and the crimped connection 7 which is positioned within the tubular portion 3 and adjacent the closed end 9 thereof. The stator assembly, or just the connecting insulators, may then be heated by any conventional means (such as infrared heat lamps, as the stator assembly is moved on the production conveyor) to shrink them so as to grip the lead wires 31 and 33 and the crimped connections 7 as illustrated in FIG. 8. The electrical connections which are protected and insulated by the heat shrunk connection insulators 1 are then positioned (FIG. 9) in respect to the outer or main winding 23 so as to locate a substantial part of the free end of tab portion 11 in engagement with the inner surface of the end turns of the coils of winding 23 and between these and the outer surface of the inner or auxiliary winding coil contiguous thereto, and preferably with the insulated connection located on the outside of interphase insulation layer 29. A substantial part of the free end of the tubular portion 3 is positioned in engagement with the inner surface of the end turns of the adjoining coil or coils of winding 23 and the outer surface of the auxiliary winding coil contiguous thereto, and preferably with the insulated connection on the outside of interphase insulation layer 29. The parts of the tubular and tab portions not so engaged by the end turns of these adjoining coils span or bridge the space between these winding coils.

Figure 10:
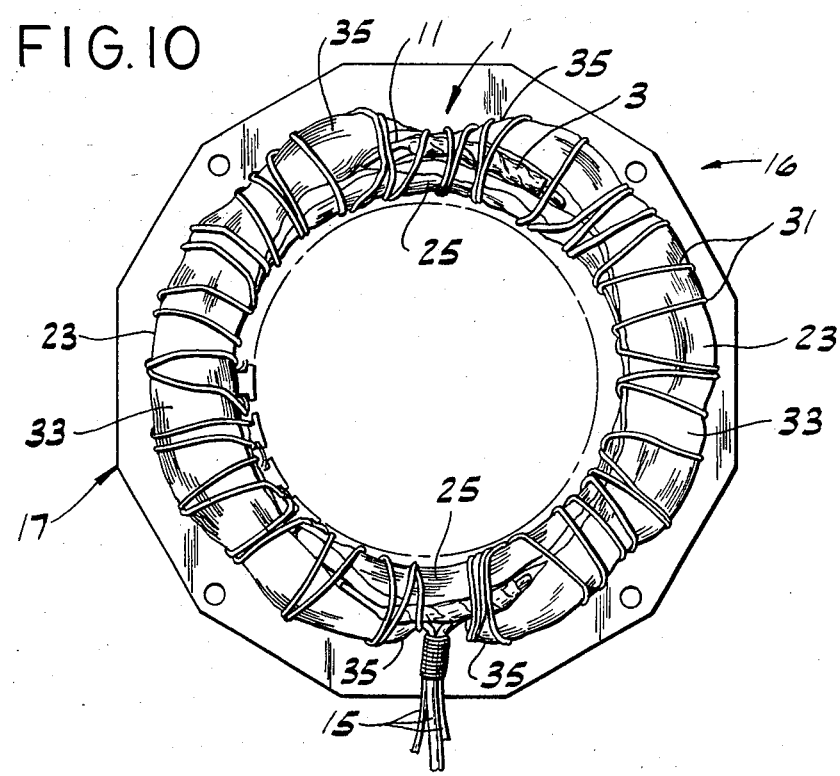
FIGS. 10 and 11 are, respectively, a plan and an elevation of the completed stator assembly after end turn forming and lacing on a larger scale than FIG. 9.
Figure 11:
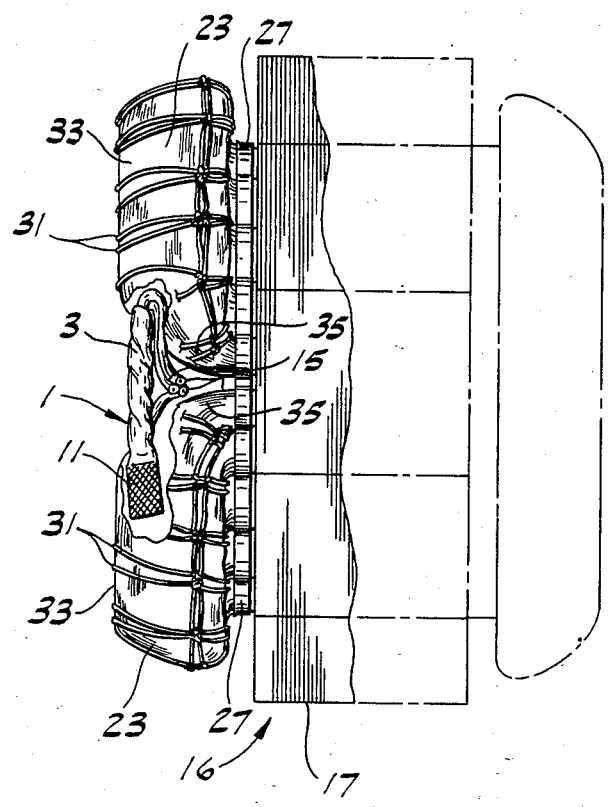

After so positioning the insulated connections the stator assembly is subjected to a pressing operation for shaping and compressing the end turns of the windings and then, preferably, they are laced and tied. As illustrated in FIGS. 10 and 11, this may be accomplished by tightly wrapping cord 31, which may be formed from polyester textile fibers sold under the trade designation "Dacron", around the end turns of windings 23 and 25 to hold them together as a unitary mass. As compacted the end turns of the coils of the windings will have flattened compressed central portions 33 with knee portions 35 at the corners thereof. During this application of pressure forces to the end turns substantial parts of the free ends of the tubing and tab portions of the connection insulators 1 are grippingly engaged by the knee portions 35 of adjoining coils of the windings so as to firmly anchor both ends of insulator 1. The roughened surfaces of tab portion 11 provide advantageous frictional engagement for this purpose. However, as the connection 7 is positioned adjacent the junction 13 of insulator 1 and this portion of the insulated connection is in the space, or at the break, between the main winding coils it is substantially unaffected by the pressure forces applied during compacting and forming of the end turns. Thus any burrs or sharp edges of connection 7 formed during mechanical crimping of connector 8 will not be forced against the inner surfaces of tubular portions 3 to either reduce the insulation value of, or actually puncture, the insulator wall.

Figure 9:
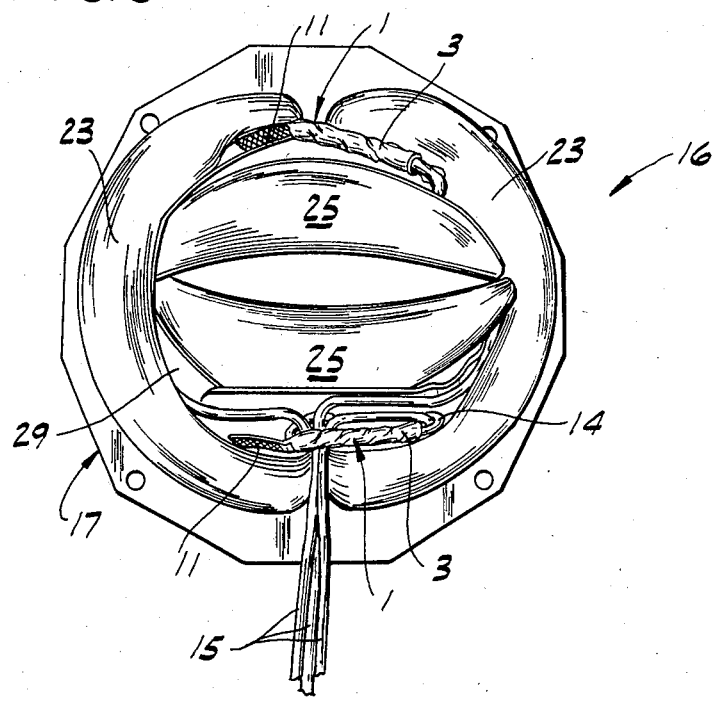
FIG. 9 is a plan of the stator assembly after the insulated connections and leads are positioned between coils of motor windings and prior to compacting and forming the end turns.

An optional, but preferred, step in the manufacture of an hermetic motor is to craze anneal the stator assembly following lacing. This step further ensures the integrity of the enamel coating on the winding conductors which can become crazed during the compacting and forming operation. If desired, the heating of the connection insulators to shrink them can conveniently take place during such craze annealing rather than effecting heat shrinking before tucking the connections protected by the preshrunk connection insulators between the end turns of adjoining main winding coils (FIGS. 8 and 9). An exemplary craze annealing operation will subject the compacted and formed units to a temperature of about 95° C. for up to 15 minutes. Thus the heat shrinking of the connection insulators and the craze annealing may be carried out concurrently. As the lacing cord 31 will shrink (in the order of 7–8%) when so heated, it will increasingly tighten about the end turns of the windings.

The connection insulators, stator assemblies, and methods described above are particularly advantageous in the production of hermetic motors for use in refrigerant compressor units as they require no mastic material and are free of any components which during motor operation would form compounds or substances which would deleteriously affect the refrigerant, lubricant, wire insulation, or other components of a motor-compressor unit.

From the foregoing it is now apparent that novel connection insulators as well as novel stator assemblies incorporating such connection insulators and methods of making insulating electrical connections for such stator assemblies have been disclosed meeting the objects and advantageous features set out hereinbefore, as well as others, and that modifications as to the precise configurations, shapes, and details, as well as the precise steps of the methods, may be made by those having ordinary skill in the art without departing from the spirit of the invention or the scope thereof as set out by the claims which follow.

What we claim as new and desire to secure by Letters Patent of the United States is:

1. In a method for making a stator assembly for a dynamoelectric machine having a magnetic core and at least one winding arranged thereon comprising a plurality of coils of wire conductors with end turns thereof projecting beyond side faces of the core and with lead wires extending therefrom; the steps of:

forming an electrical connection joining at least one of the lead wires with another wire;

inserting the connection into the open end of a tubular portion of a flexible heat-shrinkable electrical insulator having a closed end and an integral elongage flat tab portion extending endwise along the central axis of the tubular portion from the closed end thereof so as to position the electrical connection adjacent the closed end of the tubular portion;

heating the insulator to shrink it so as to grip the connection therein;

positioning the heat-shrunk connection-bearing insulator to locate a substantial part of the free end of the elongate tab portion so as to be engaged by the end turns of one coil and positioning the free end of the tubular portion so as to be engaged by the end turns of an adjoining coil with the parts of the tubular portion and the tab portion not engaged by the end turns of the adjoining coils spanning a space therebetween; and applying pressure to the end turns to compact and form them, the connection and the parts of the tubular portion and the tab portion not engaged by the end turns being substantially unaffected by pressure forces applied during compacting and forming of the end turns.

2. In a method as set forth in claim 1 and in which the tab portion of the insulator has rough surfaces, wherein the step of forming the electrical connection comprises mechanically crimping an uninsulated metal sleeve around bared ends of at least one lead wire and one other wire.

3. In a method as set forth in claim 1, wherein the pressure applying step compacts the end turns of the coils and forms them so as to have a flattened compressed central portion with knee portions at the corners thereof, the positioning of the substantial parts of the free ends of the tubular and tab portions of the insulator locating them so as to be engaged by the knee portions.

4. In a method as set forth in claim 1 and in which the stator assembly includes a second winding comprising a plurality of coils of wire conductors arranged on the core with end turns thereof projecting beyond side faces of the core and with the coils thereof offset circumferentially relative to the coils of the one winding and with that one winding comprising an outer winding layer and the second winding comprising an inner winding layer, wherein the positioning of the substantial parts of the free ends of the tubular and tab portions of the insulator locates the connection insulator between the inner and outer winding layers with the substantial part of the free end of the tab portion grippingly engaged between the end turns of a coil of the outer layer and the end turns of an inner layer coil and with the substantial part of the free end of the tubular portion grippingly engaged between the end turns of an adjoining coil of the outer layer and the end turns of the aforesaid inner layer coil.

5. In a method as set forth in claim 4, the further step of inserting a layer of flexible sheet insulation material between the end coils of the inner and outer winding layers prior to applying pressure to the end turns to compact and form them.

6. In a method for making a stator assembly for a dynamoelectric machine having a magnetic core and at least one winding arranged thereon comprising a plurality of coils of wire conductors with end turns thereof projecting beyond side faces of the core and with lead wires extending therefrom; the steps of:

forming an electrical connection joining at least one of the lead wires with another wire;

inserting the connection into the open end of a tubular portion of a flexible heat-shrinkable electrical insulator having a closed end and an integral elongate flat tab portion extending endwise along the central axis of the tubular portion from the closed end thereof so as to position the electrical connection adjacent the closed end of the tubular portion;

positioning the connection-bearing insulator to locate a substantial part of the free end of the elongate tab portion so as to be engaged by the end turns of are coil and positioning the face end of the tubular portion so as to be engaged by the end turns of an adjoining coil with the parts of the tubular portion and the tab portion not engaged by the end turns of the adjoining coils spanning a space therebetween; and applying pressure to the end turns to compact and form them, the connection and the parts of the tubular portion and the tab portion not engaged by the end turns being substantially unaffected by pressure forces applied during compacting and forming of the end turns; and heating the insulator to shrink it so as to grip the connection therein.

7. In a method as set forth in claim 6 and in which the tab portion of the insulator has rough surfaces, wherein the step of forming the electrical connection comprises mechanically crimping an uninsulated metal sleeve around bared ends of at least one lead wire and one other wire.

8. In a method as set forth in claim 6 wherein the pressure applying step compacts the end turns of the coils and forms them so as to have a flattened compressed central portion with knee portions at the corners thereof, the positioning of the substantial parts of the free ends of the tubular and tab portions of the insulator locating them so as to be engaged by the knee portions.

9. In a method as set forth in claim 6 and in which the stator assembly includes a second winding comprising a plurality of coils of wire conductors arranged on the core with end turns thereof projecting beyond side faces of the core and with the coils thereof offset circumferentially relative to the coils of the one winding and with that one winding comprising an outer winding layer and the second winding comprising an inner winding layer, wherein the positioning of the substantial parts of the free ends of the tubular and tab portions of the insulator locates the connection insulator between the inner and outer winding layers with the substantial part of the free end of the tab portion grippingly engaged between the end turns of a coil of the outer layer and the end turns of an inner layer coil and with the substantial part of the free end of the tubular portion grippingly engaged between the end turns of an adjoining coil of the outer layer and the end turns of the aforesaid inner layer coil.

10. In a method as set forth in claim 9, the further step of inserting a layer of flexible sheet insulation material between the end coils of the inner and outer winding layers prior to applying pressure to the end turns to compact and form them.

* * * * *